United States Patent
Hack et al.

(10) Patent No.: US 7,280,973 B1
(45) Date of Patent: Oct. 9, 2007

(54) VALUE CHAIN OPTIMIZATION SYSTEM AND METHOD

(75) Inventors: Stefan Hack, Wiesloch (DE); Michael Augsburger, Dossenheim (DE); Miho Birimisa, Karlsruhe (DE)

(73) Assignee: SAP AG, Walldorf (DE)

( * ) Notice: Subject to any disclaimer, the term of this patent is extended or adjusted under 35 U.S.C. 154(b) by 601 days.

(21) Appl. No.: 09/609,714

(22) Filed: Jun. 30, 2000

Related U.S. Application Data

(60) Provisional application No. 60/191,452, filed on Mar. 23, 2000.

(51) Int. Cl.
G06Q 10/00 (2006.01)

(52) U.S. Cl. .............. 705/7; 715/848; 345/440
(58) Field of Classification Search ........... 705/7–9; 717/132, 156; 345/804
See application file for complete search history.

(56) References Cited

U.S. PATENT DOCUMENTS

| | | | | |
|---|---|---|---|---|
| 4,674,042 A | | 6/1987 | Hernandez et al. | 364/401 |
| 4,813,013 A | * | 3/1989 | Dunn | 715/763 |
| 5,621,871 A | * | 4/1997 | Jaremko et al. | 345/441 |
| 5,630,069 A | * | 5/1997 | Flores et al. | 705/7 |
| 5,740,341 A | * | 4/1998 | Oota et al. | 345/420 |
| 5,884,287 A | | 3/1999 | Edesess | 705/36 |
| 5,887,154 A | * | 3/1999 | Iwasa et al. | 703/6 |
| 5,953,707 A | * | 9/1999 | Huang et al. | 705/10 |
| 6,119,149 A | | 9/2000 | Notani | 709/205 |
| 6,233,493 B1 | * | 5/2001 | Cherneff et al. | 700/95 |
| 6,243,101 B1 | * | 6/2001 | Erskine | 345/619 |
| 6,393,425 B1 | * | 5/2002 | Kelly | 707/100 |
| 6,460,058 B2 | * | 10/2002 | Koppolu et al. | 715/738 |
| 6,604,114 B1 | * | 8/2003 | Toong et al. | 707/104.1 |
| 2001/0039570 A1 | * | 11/2001 | Stewart et al. | 709/205 |

FOREIGN PATENT DOCUMENTS

JP 11316780 A * 11/1999

OTHER PUBLICATIONS

PR Newswire, VIT's 'SeeChain NOW!' Program Delivers Supply Chain Visibility for SAP Customers in as Little as 90 Days, Pr Newswire, New York, Sep. 13, 1999, p. 1 [Proquest].*
Business Editors, DeskTalk Announces Next Generation TREND ReportPacks Automating Web-Based Performance Reporting, Business Wire May 5, 1998, p. 1 [Proquest].*
Cheng, An Object-Oriented Organizational Model to Support Dynamic Roll-based Access Control in Electronic Commerce Applications, Proceedings of the 32nd Hawaii International Conference on System Sciences, 1999 [GOOGLE].*
Popov et al., Capabilities of the Process Modeling Tool, document No. CONFLOW.97.07, Conflow, Dec. 20, 1999 [Google].*

(Continued)

*Primary Examiner*—Beth Van Doren
*Assistant Examiner*—Jonathan G Sterrett
(74) *Attorney, Agent, or Firm*—Mintz, Levin, Cohn, Ferris, Glovsky & Popeo, P.C.

(57) ABSTRACT

The activities and interactions between participants in a Collaborative Business Scenario are displayed as various views of polygons that are positioned to communicate interactions, communications, implementations, and qualitative and quantifiable business benefits resulting in successful optimization of an enterprise's value chain.

21 Claims, 9 Drawing Sheets

OTHER PUBLICATIONS

White, VIT SeeChain Portal: An Information Portal for the Enterprise, DataBase Associates International, Inc. Version 2, Aug. 1999 [Google and Wayback Machine].*
PR Newswire, VIT Announces SeeChain™ Product Line—Fine Supply Chain Performance Applications, PR Newswire, New York, Jun. 14, 1999 [PROQUEST].*
Stephens, Scott; "Supply Chain Council & Supply Chain Operations Reference (SCOR) Model Overview", May 1999, pp. 1-31.*
Hakanson, Bill; "Supply Chain Letter", Nov. 1998, web.archive.org webpage of Dec. 5, 1998, web.archive.org/web/19981205005230/www.supply-chain.org/html/about_sec.htm.*
Anonymous, "Global link missing from supply chain model", Aug. 1999, Transportation & Distribution. Cleveland:.vol. 40, Iss. 8; p. 7, 2 pgs.*
Anonymous, "SCOR model users get new benchmarking tool", Apr. 8, 1999, Purchasing.Boston:.vol. 126, Iss. 5; p. 33, 2 pgs.*
Anonymous, "SCOR model is key link to stronger supply chain", Sep. 1998, Automatic I.D. News. Cleveland:. vol. 14, Iss. 10; p. 52 (4 pages).*
Baer, Tony, "What's brewing: Java and manufacturing", Jul. 1997, Manufacturing Systems Hot Issues for Hot Times Supplement, pp. 2-8, Dialog 01493138 01-44126.*
Is your supply chain playing by the rules? Perry A Trunick. Transportation & Distribution. Cleveland:Sep. 1998. vol. 39, Iss. 9, p. 51-55 (4 pp.).*
Supply Chain Council: Growing, branching out Anonymous. Modern Materials Handling. Boston:Nov. 1998. vol. 53, Iss. 13, p. 20-21 (2 pp.).*
SCM: Another acronym to help broaden enterprise management Lawrence S Gould. Automotive Manufacturing & Production. Cincinnati:Mar. 1998. vol. 110, Iss. 3, p. 64-69 (6 pp.).*
Putting an end to islands of manufacturers Anonymous. Modern Materials Handling. Boston:Feb. 1998. vol. 53, Iss. 2, p. 40-41 (2 pp.).*
Efficient supply chain practices mean big savings to leading manufacturers Allen Allnoch. IIE Solutions. Norcross:Jul. 1997. vol. 29, Iss. 7, p. 8-9 (2 pp.).*
DNA spells supply chain integration Marty Weil. Manufacturing Systems. Wheaton; Mar. 1999. p. 10 A ProQuest Document ID 39994647.*
Workflow Automation Crosses Company Lines David Joachim. InternetWeek. Manhasset. Apr. 6, 1998, Iss 709; p. PG S.04 ProQuest Document ID 28441803.*
SAP and Microsoft Work Together to Establish Common Business Frameworks for Electronic-Commerce Content Business Editors, High-Tech Writers. BusinessWire. New York; Mar. 4, 1998. p. 1. ProQuest Document ID 39464102.*
Distributed embedded Intelligence blazing processing trails Robert L Moore, InTech; Mar. 1997; 44, 3; Research Library p. 50.*
Marcel Mourits; Joseph J.M. Evers; "Distribution network design: an integrated planning support framework", 1996, Logistics Information Management v9n1 pp. 45-54, Dialog 02246763 86066472.*
Harrington, Lisa H; "Software tools to revamp your supply chain", Nov. 1998, Transportation & Distribution v39n11 pp. 59-70, Dialog 01735827 03-86817.*
Mourits, Marcel; Evers, Joseph J M; "Distributed network design", 1995 International Journal of Physical Disbtribution & Logistics Management v25n5 pp. 43-57, Dialog 01070336 97-19730.*
System Design with Aris Hobe™ and Rational Unified Process, "ARIS and UML," Whitepaper (IDS Scheer AG, Feb. 2002).
"ARIS Toolset™,The Professional Tool for E-Business Engineering, Product Description and Fact Sheet," (IDS Scheer AG, Nov. 2002).
"ARIS Framework Concept,eEPC," (IDS Scheer AG) (accessed from IDS Scheer AG website, Dec. 31, 2002).
Oracle Corporation, "Oracle Business Case Analysis Data Sheet," (accessed from http://www.oracle.com/consulting/offerings/strategy/sva_ds.html, Dec. 31, 2002).
"E-Business und Enterprise Application Integration: Der Schlussel zum e-Erfolg," (Meta Group Deutschland GmbH, 2001) (portion translated to English).
Sabatina Scelza, "Informationstechnologische Unterstützun des Supply Chain Management," (Dissertation, J. W. Goethe Univ., Aug. 13, 1999).
A. W. Scheer, "Business Process Engineering," (Springer-Verlag, 2$^{nd}$ edition, 1994).
Thomas Hess/Leo Brecht, "State of the Art des Business Process Redesign—Darstellung unde Vergleich bestehender Methoden," (Gabler Jan. 1995).

* cited by examiner

VALUE CHAIN OPTIMIZATION SYSTEM AND METHOD

RELATED APPLICATIONS

Provisional U.S. Patent Application No. 60/191,452 entitled "VALUE CHAIN OPTIMIZATION SYSTEM AND METHOD" filed Mar. 23, 2000, is relied upon and is incorporated by reference in its entirety in this application.

BACKGROUND OF THE INVENTION

1. Field of the Invention

This invention relates generally to data processing systems and, more particularly, to value chain optimization in business scenarios.

2. Description of the Related Art

Every day, more businesses gain access to the Web, and create electronic commerce systems. Electronic commerce, or "e-commerce," is the term often used to refer to providing goods and services to consumers and/or other businesses using the Internet. E-commerce is a unique opportunity for businesses of any size and can expand a business's marketplace.

Developing a coherent e-commerce initiative can take an enormous amount of resources. Simply purchasing a Web server and Internet shopping software does not enable a business to profit from e-commerce, regardless of the business. That is, intensifying global competition, increasing customer demands, and rapidly changing markets require a business wanting to create an e-commerce business initiative to develop not only new business models but also new ways to represent these models. Current business models do not conform well with "Internet time" and should be redefined for suitability in the e-commerce age.

To help a business redefine its business model and gain a more refined control over various e-commerce business processes, the concept of "business modeling" has become important to help optimize business processes. Business modeling may include creating a set of "navigational maps" that help businesses expand into and/or "engineer" a new area. The models may be a set of tools, or charts corresponding to various business scenarios and business processes (e.g., organizational charts, workflows, tasks, hierarchy charts, entity relationship models, and process matrixes).

To visualize business processes and scenarios, businesses use both "Value Chains" and "Event Driven Process Chains" (EPCs). Value chains are chains of value-added events starting from a beginning of the making of an end-product (or service) through the completion of the making of the end-product. Thus, a value chain describes the creation process from raw material until the final product.

EPCs are also an integral part in visualizing business processes and scenarios. EPCs link data, tasks, and organizations in various business processes. EPCs depict processes and activities throughout an enterprise as linear flow charts to help the enterprise refine their business. An EPC consists of events (e.g., an order is received), functions (e.g., check order), linking operators that connect events and functions, and a process path that represents logical connections between processes within a business scenario. Although EPCs provide increased levels of optimization when implemented in an enterprise, and accordingly help businesses create e-commerce initiatives, they are limited in their features capability and do not provide any cross-enterprise functionality.

SUMMARY OF THE INVENTION

In accordance with the invention, systems and methods consistent with the present invention create a collaboration between members of an e-community within a Collaborative Business Scenario (CBS). Specifically, the CBS combines one enterprise with various business participants from multiple industries to maximize the value potential for the participants involved in the collaboration. The CBS also provides tools to conceive and discuss new collaborative business models within various e-communities. The CBS may encompass electronic marketplaces, consumers, and multiple enterprises.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention.

DETAILED DESCRIPTION

Reference will now be made in detail to an implementation consistent with the principles of the present invention as illustrated in the accompanying drawings. Wherever possible, the same reference numbers will be used throughout the drawings and the following description to refer to the same or like parts.

Overview

Methods and systems consistent with the present invention create collaboration between members of an e-community within a Collaborative Business Scenario (CBS). An e-community is a virtual community pursuing a common business goal using electronic commerce. Collaboration is in creating value-generating business processes that extend beyond the boundaries of one enterprise. That is, collaboration combines one enterprise with various business participants from multiple industries. A CBS is several participants in different enterprises working on a common goal linking different activities (e.g., collaborative planning, vendor-managed inventory). To achieve the goal, enterprises share information and define responsibilities for specific activities. As such, the CBS may span several enterprise systems.

Enterprises desire to optimize value chains within a given industry. CBSs provide a tool to analyze, plan, and optimize value chains for an enterprise within a given industry. The CBS may perform value chain optimizations for not only one enterprise but also for other business participants beyond the confines of one enterprise. For example, in an oil and gas enterprise, CBSs may involve engineering project collaboration with engineering suppliers, collaborative planning with distributors, or collaborative forecasting and replenishment with service station retailers.

Figure 1:
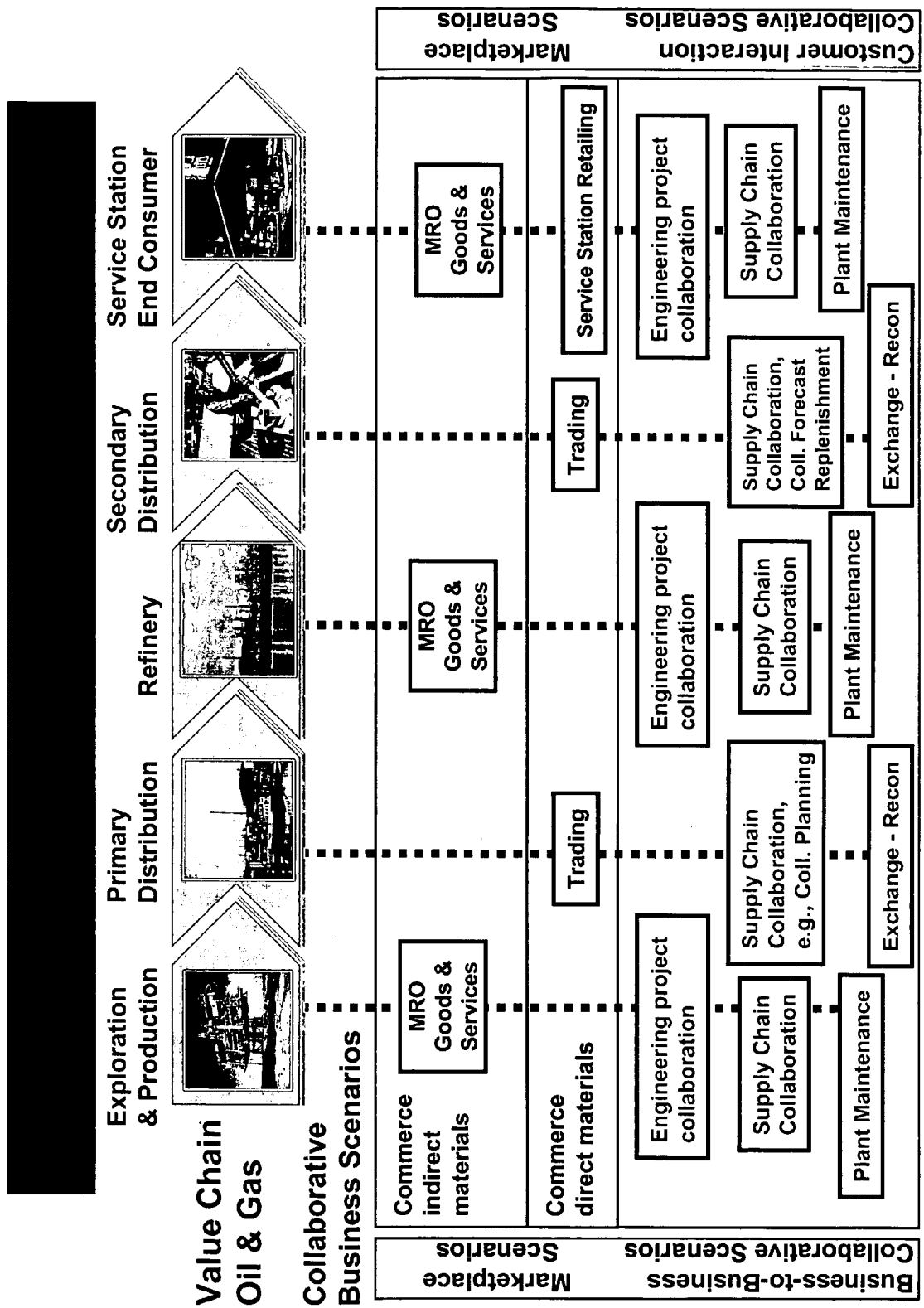
FIG. 1 is an exemplary representation of an oil and gas enterprise value chain showing opportunities for value chain optimization with CBSs.

FIG. 1 depicts an exemplary oil and gas five step value chain and various CBSs for the oil and gas value chain. The value chain starts with exploration & production of oil and ends with providing the oil at a service station, as indicated in FIG. 1. The CBSs may consist of categories, such as business-to-business scenarios, customer interaction scenarios, or marketplace scenarios.

A CBS can be used in a variety of industries or business communities. The CBS consists of various entities, such as participants (e.g., importers, suppliers OEMs, manufacturers, distributors, vendors, sellers, end-customers, insurance companies, publishing companies, service companies, paper manufacturer), activities (e.g., order tracking, receipt processing, production, search requests), information sharing (e.g., business documents, status reports, purchase orders), document flow features (e.g. a search for specified vehicles), roles (e.g., employee roles such as a strategic purchaser), business benefits (e.g., improved buying power, reduced delivery times, cost advantages, increased customer satisfaction), value potential (e.g., 50% increase), type of CBS (e.g., Business to Business Scenario, mySAP.com Marketplace Scenario, Customer Interaction Scenario), and the relationship to an SAP Solution Map, all described below.

Each participant in a CBS acts according to a specific role (e.g., an employee that purchases goods is a purchaser), and each activity contains functionality and relates to a participant's role. CBSs also contain business documents, information flow, and systems landscapes (e.g., roles of the systems, software components, software releases, information to exchange between each system, and functions to process exchanged information within a system). Various aspects of CBSs are also described below.

The CBS enables a top-down approach to optimize value chain between enterprises. This allows the inter-company processes as well as cross-industry processes to be described. The CBS also provides an intuitive graphical design illustrating various collaborative aspects. The various illustrations, although directly derived from one another, cover separate aspects, offer complementary information (e.g., business view, interaction view, component view), and define business benefits for various participants. Moreover, the illustrations explain the contribution of each participant of inter-company collaboration to value creation.

In addition, the CBS enables discussion between business partners on new business opportunities using inter-company collaboration. The discussions facilitate discussions between companies and business partners regarding business benefits as well as discussions with software vendors on the feasibility and scope of required software solutions as well as its subsequent implementation. For example, software vendors provide specified functionality that fits into a specific activity of a CBS. Thus, participants may choose to agree with vendors regarding the standards used to exchange documents between activities.

Method of Operation

Figure 2A:
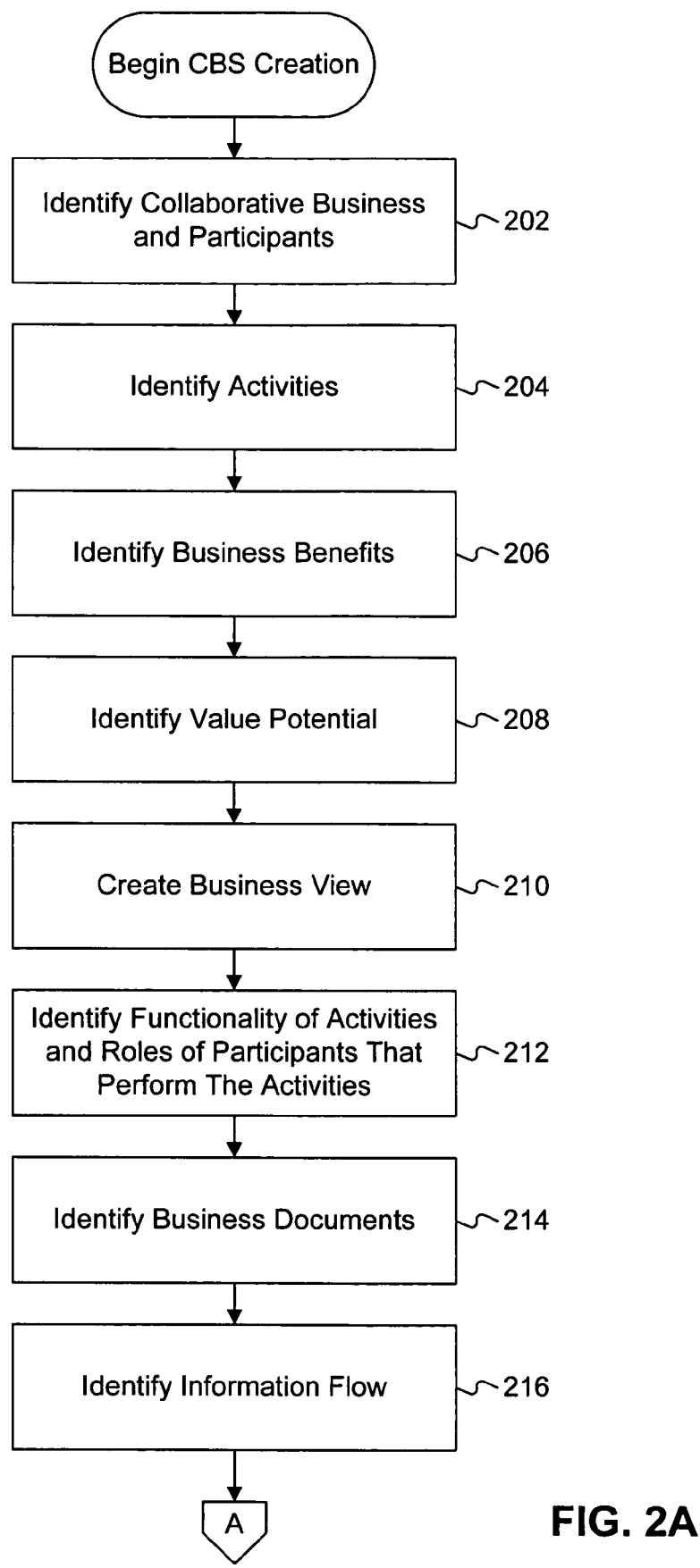
FIGS. 2A and 2B are collectively a flow diagram representing the steps performed by a method consistent with the present invention.
Figure 2B:
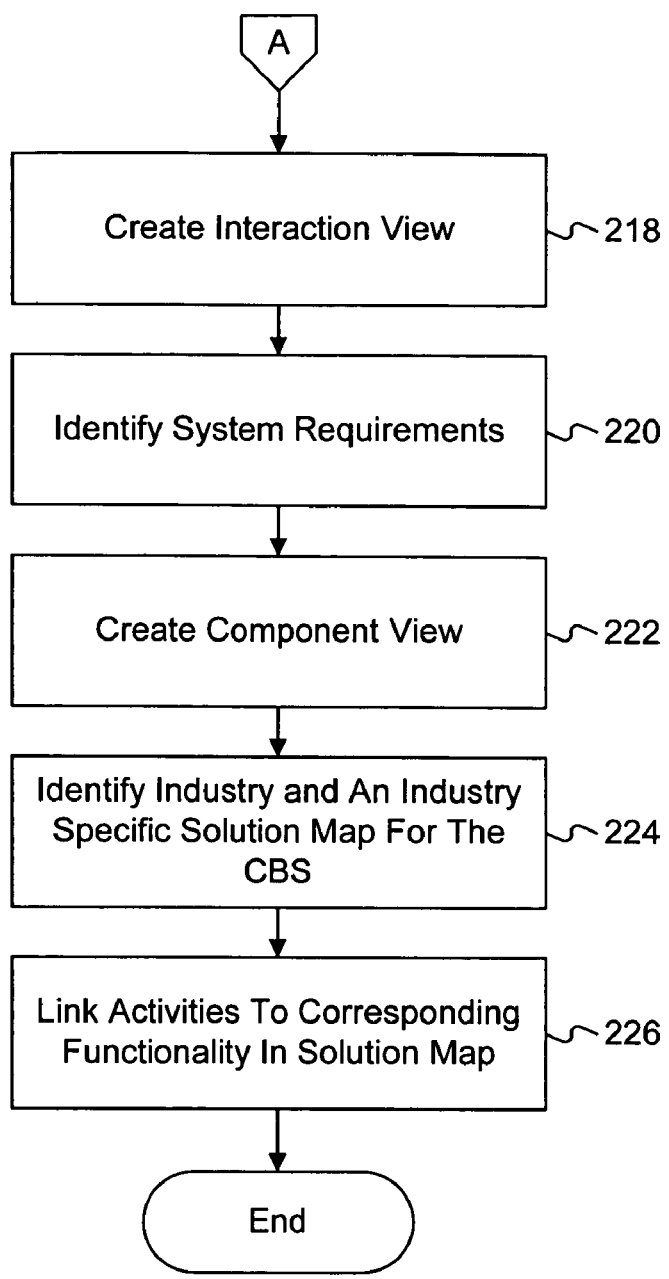

FIGS. 2A and 2B are a flow diagram representing the steps performed by a method consistent with the present invention when creating a CBS. Some aspects of the following method will vary depending on the nature of the activities of the business being evaluated. The following example describes an organization whose principal activity is the manufacture and development of vehicle sales. Information for the CBS may be obtained from various sources, such as industry, business, or value chain expertise, knowledge on value-added activities of each of the participants involved, knowledge on the individual information needs of each role in the entire business scenario, knowledge of employee roles, data modeling expertise, knowledge of the industry business blueprints and Solution Maps (described below), business application expertise (e.g., SAP Financials), implementation expertise, identification of value potentials by realizing collaborative business opportunities that result in tangible business benefits, industry knowledge anticipating the quantifiable business benefits, and/or independent studies (e.g., Harvard Business Review, Goldman Sachs, Management Consulting Firms).

First, all participants in the CBS are identified (step 202). The types of participants identified (e.g., OEM, importers, dealers) will dictate the type of CBS to use. For example, if the participants are employees of different enterprises (e.g., OEM, importer, dealer), the type of CBS is a "Business to Business Scenario" CBS. As another example, if the participants are buyers and sellers in an electronic marketplace, then the type of CBS is a "mySAP.com Marketplace Scenario." In yet another example, if the parties are multiple enterprises working together to supply information to a set of customers, then the CBS is a "Customer Interaction Scenario."

Next, activities performed by the participants to achieve a common business goal are identified (step 204), business benefits are identified (step 206), and value potentials for the business benefits are identified (step 208). With the information identified in steps 202, 204, 206, and 208, a business view is created (step 210). Business views depict the interaction between participants, activities, business benefits, and/or value potentials.

Figure 3:
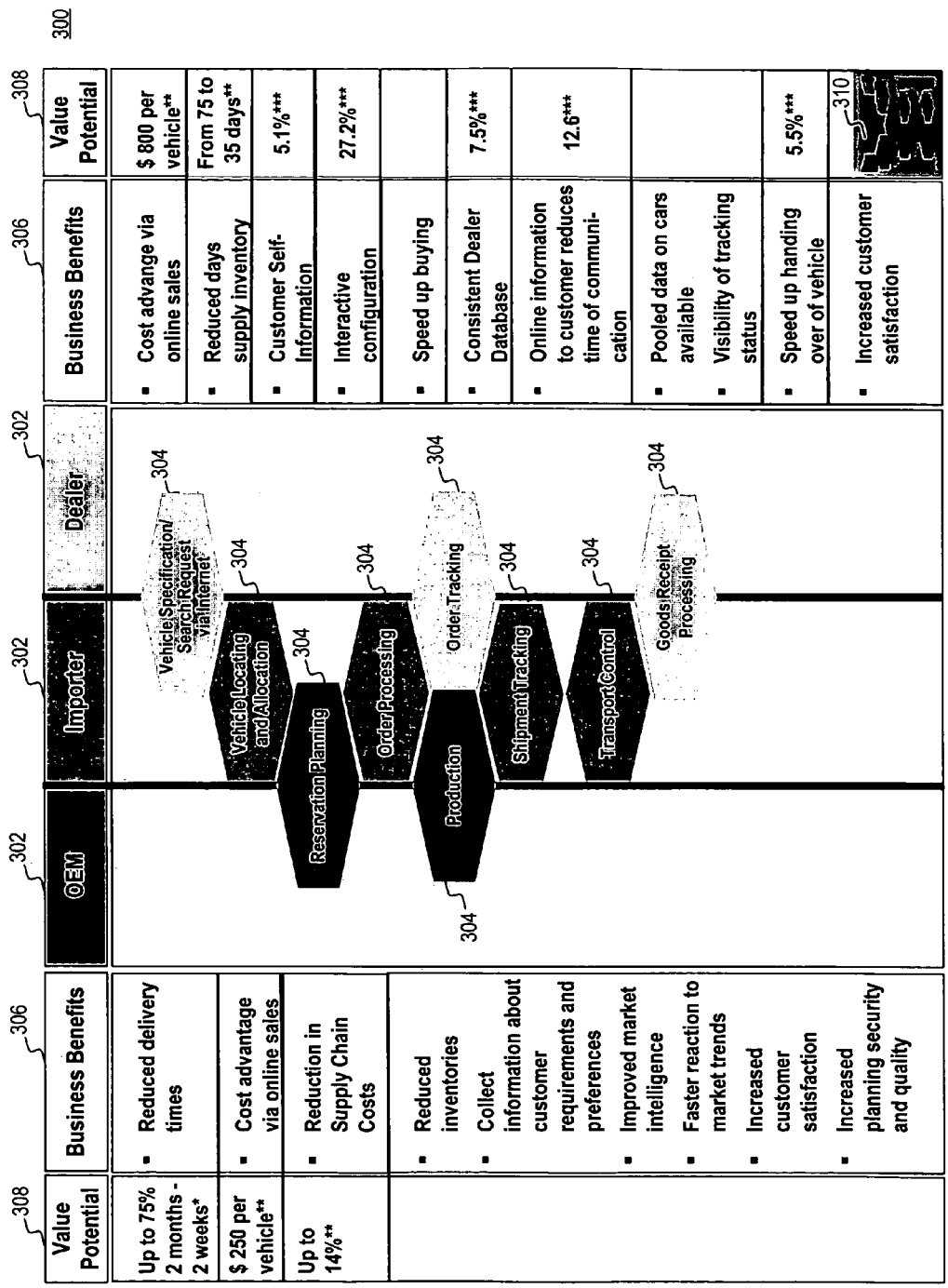
FIG. 3 is an exemplary business view for use in a manner consistent with the present invention.

FIG. 3 depicts an exemplary business view 300 in accordance with the present invention. Business view 300, which is a graphical depiction of interlocking polygons (e.g., hexagons), enables the integration of common business purposes, and the ability to anticipate business benefits while implementing the CBS. Also, business view 300 provides value potential in terms of quantifiable business benefits (e.g., reduced delivery time by up to 75%) that allow return-on-investment (ROI) calculations to be formulated.

View 300 illustrates collaboration between various participants involved (e.g., OEM, importer, and dealer), types of CBS present, collaborative aspects between the participants, scope of the business collaboration, impact on the business and the value chain, anticipated business benefits, and quantifiable value potential.

Business view 300 comprises participants 302, activities 304, business benefits 306, value potentials 308, and zipper button 310. Participants 302 are depicted in vertical lanes signified in different colors. Activities 304 illustrate the sequence and scope using interlocking hexagon-shaped boxes similar to a zipper. Zipper button 310 links business view 300 to interaction view 400 (described below).

Business benefits 306 consist of qualitative business benefits (e.g., improved market intelligence) and quantitative/quantifiable business benefits with so-called value potentials 308 (e.g., reduced delivery times by up to 75%).

Once business view 300 is created, a functionality of each activity 304 and roles of participants that perform those activities 304 are identified (step 212 in FIG. 2), various business documents are identified (step 214), and information flow between participants 302 is identified (step 216). For example, a role of an employee (participant) may be as a strategic purchaser, and the functionality may be to create vehicles pools, or search for new vehicles. Business documents are documents exchanged between activities 304.

Figure 4A:
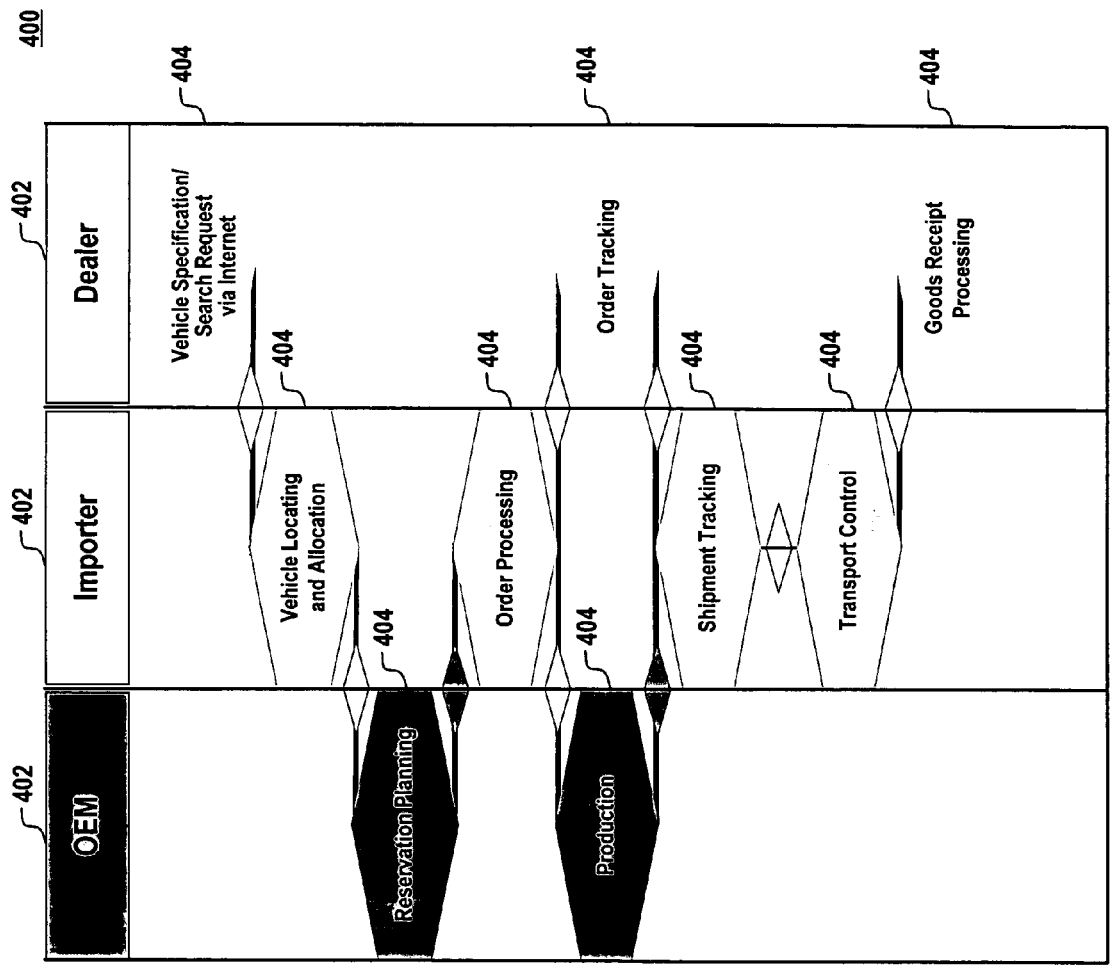
FIGS. 4A and 4B depict exemplary interaction views for use in a manner consistent with the present invention.

Finally, information flow relates to information movement between activities 304. With the information from steps 212, 214, and 216, an interaction view is created (step 218). FIG. 4A depicts an exemplary interaction view 400 in accordance with the present invention. Interaction view 400 is derived directly from business view 300 and includes additional information, identified in steps 212, 214, and 216, regarding the elements of collaborative interaction between the participants. That is, interaction view 400 contains additional elements detailing how information is exchanged, thereby helping to understand the CBS. Also, interaction view 400 depicts the dependency of participants involved in common business purposes, links to the personalized roles and features included in the collaboration. Thus, enabling a user to view the information exchange between participants, such as information sharing and/or document flow. Information sharing relates to having multiple participants view the same information so information is not duplicated. Document flow refers to sending a document from one participant to another so, different from information sharing, a document is copied for each participant.

Interaction view 400 depicts a sequence of collaborative activities between all participants, roles of the participants in the collaboration, detailed features for each of the collaborative activities, information shared between participants, business documents, and interfaces between the participants. Thereby illustrating the interdependency of the participants in the CBS. Similar to business view 300, interaction view 400 contains participants 402, and activities 404. Lines between activities 404 depict the flow of information and/or exchange of business documents (e.g., sales orders) between participants 402. Double triangles on each line are coded (e.g., shaded) based on the sending participant 402.

Figure 4B:
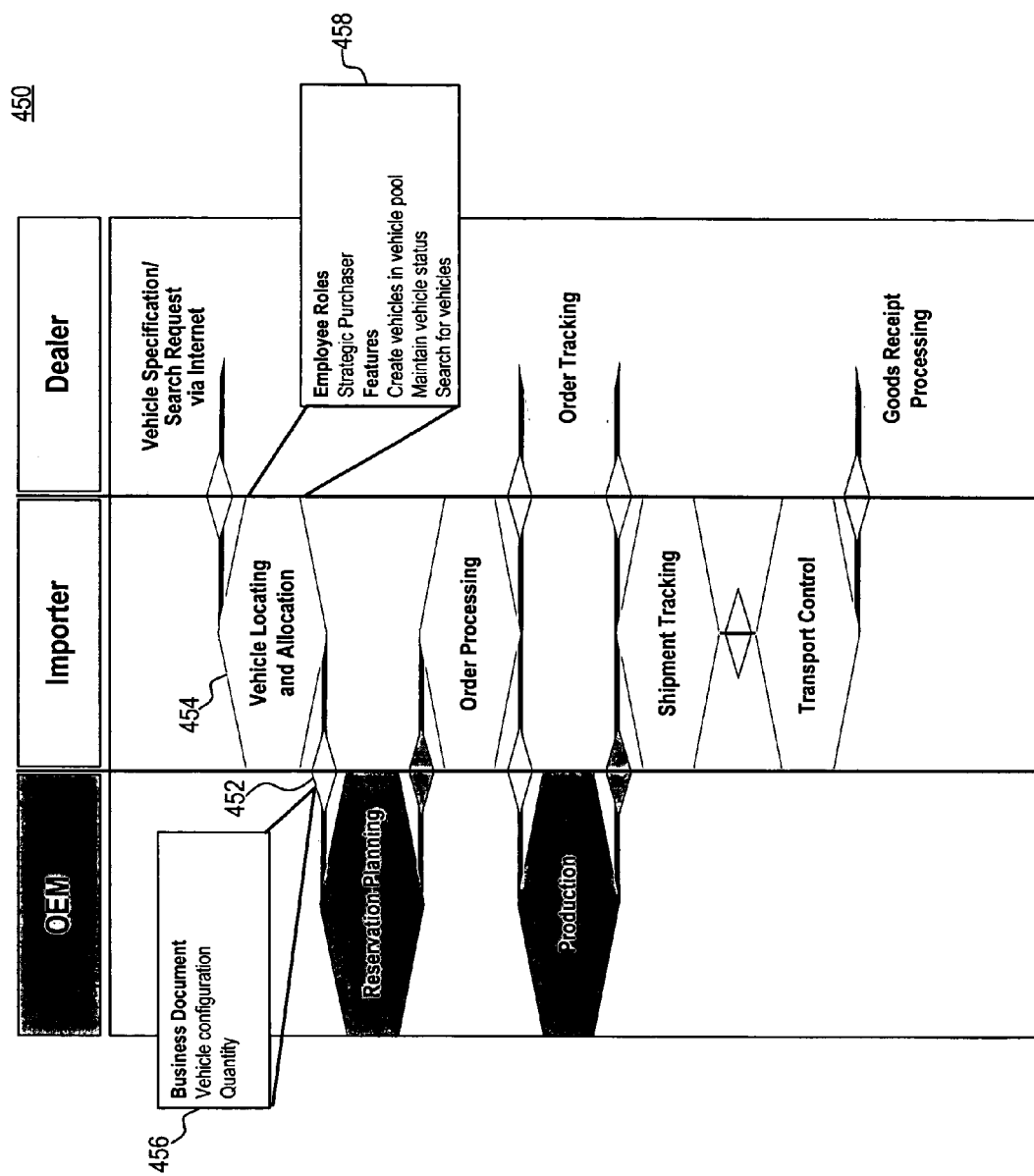

FIG. 4B depicts a second exemplary interaction view 450 in accordance with the present invention. Interaction view 450 depicts various "call-outs" 456, 458 displayed when a user selects an activity 454 or a coded triangle. For example, call-out 456 depicts a vehicle configuration business document related to triangle 452, and call-out 458 depicts the roles of a participant 302 related to the features of activity 454.

A button may link interaction view 400 to component view 500 (described below).

Once interaction view 400 is created, system requirements needed to implement the CBS are identified (step 220 in FIG. 2). For example, system requirements may be systems needed to be installed to implement the CBS, system landscapes, roles of the systems, software components, software releases, information to exchange between each system, and functions to process exchanged information within a system With the information from step 220, a component view is created (step 222).

Figure 5:
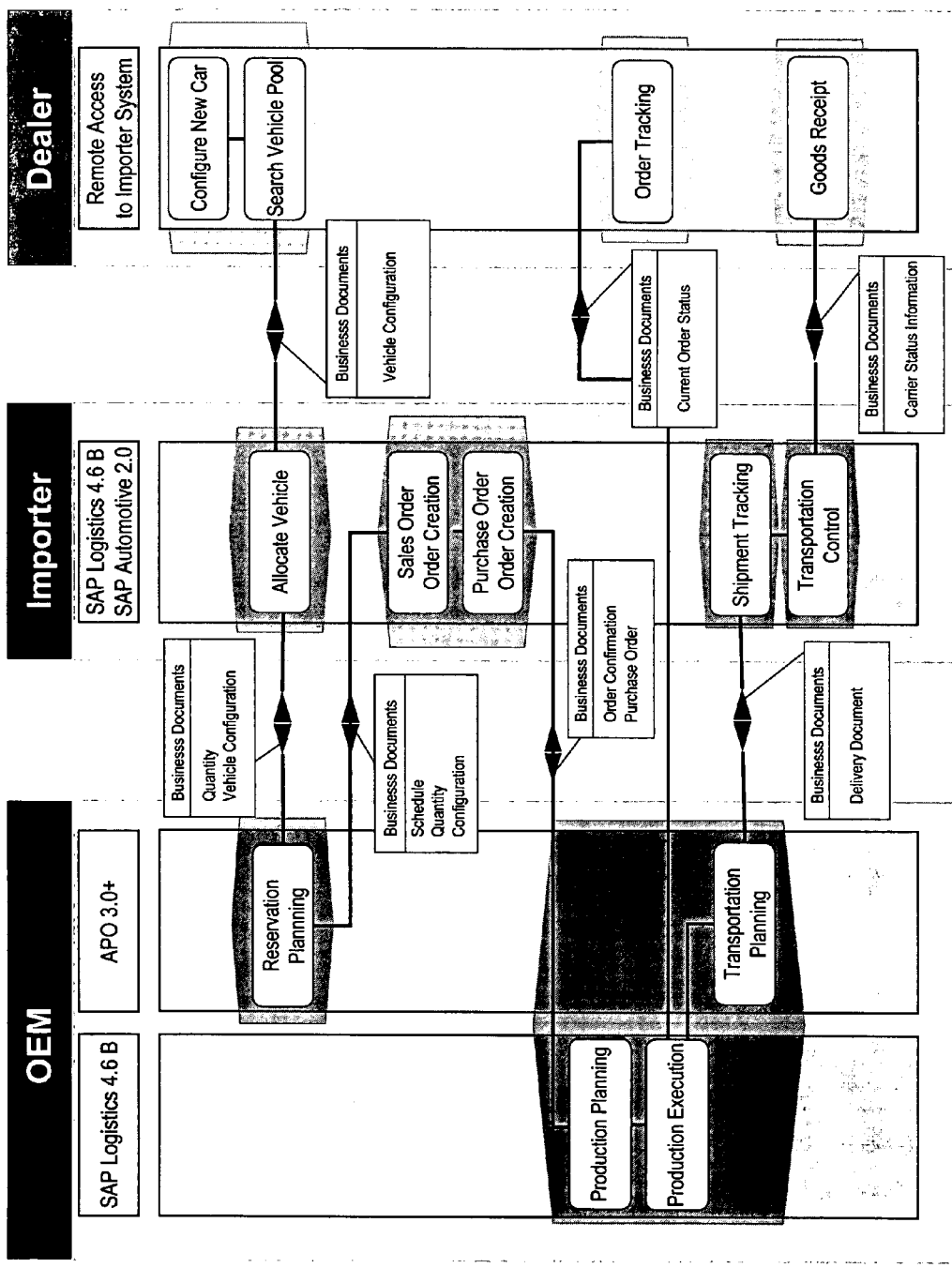
FIG. 5 depicts an exemplary component view for use in a manner consistent with the present invention.

FIG. 5 depicts a exemplary component view 500 in accordance with the present invention. Component view 500 offers a further drill-down view (e.g., technical view) of the CBS and its implementation in an installed systems landscape. The system landscape depicts the different activities of a CBS implemented in all Information Technology (IT) systems. That is, component view 500 depicts the availability of IT systems and specific activities of software components in a CBS. Component view 500 provides an exploded view of the concrete system topology in place at each participant's location. In addition to the system landscape, a concrete system topology includes the connections between various depicted systems (e.g., connecting a participant's location to another participant's location).

Component view 500 graphically depicts the overall design of the system landscape, including identification of centralized and distributed systems, individual software components, and current releases. Component view 500 also provides information relating to each system needed to be installed to implement the CBS. For example, a centralized system is the main office of the participant, whereas the distributed system is any additional site (e.g., warehouse, plant site). Component view 500 depicts a CBS at the centralized site as well as the distributed site.

Figure 6:
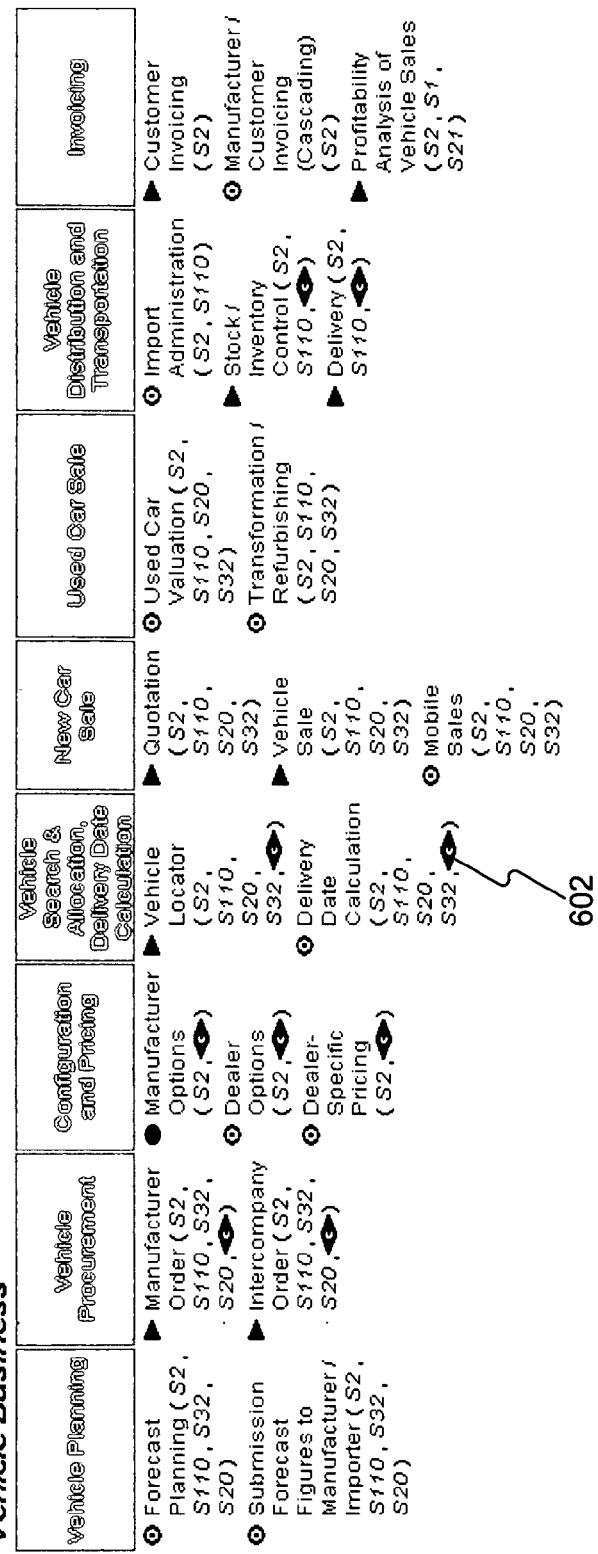
FIG. 6 depicts an exemplary Solution Map for use in a manner consistent with the present invention.

Once a component view 500 is created, a particular industry and corresponding Solution Maps for that industry are identified (step 224 in FIG. 2). A Solution Map is a tool used to analyze strategies and activities for specified industries and preferably depicts a wide range of solutions for various activities. Thus, if a Solution Map contains information that corresponds to functionality of an activity 304, that Solution Map may be linked to the activity (step 226). As an example, Solution Maps relating to the automotive industry may apply to a vehicle sales CBS. And, if the automotive Solution Maps contain solutions that correspond to an activity for purchasing vehicles, a link may be created to that automotive Solution Map from the corresponding activity. An exemplary automotive Solution Map that may be linked to a vehicle sales CBS is depicted in FIG. 6. Solution Map 600 contains links 602 to various activities 304 in views 300, 400, 450.

Architecture

Figure 7:
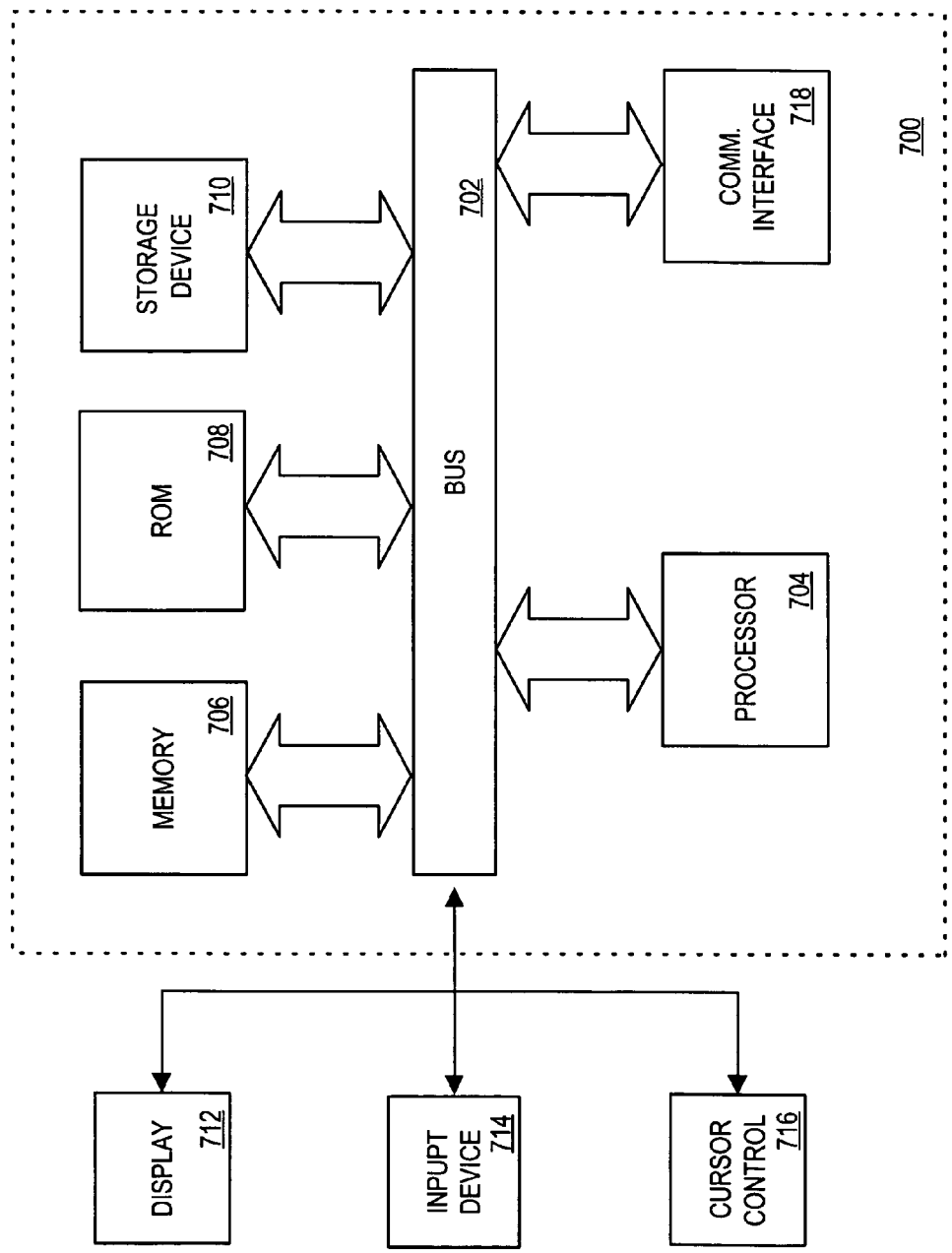
FIG. 7 shows a block diagram of a system for practicing methods and systems consistent with the present invention.

FIG. 7 is a block diagram that illustrates a computer system 700 upon which embodiments of the invention may be implemented. Computer system 700 includes a bus 702 or other communication mechanism for communicating information, and a processor 704 coupled with bus 702 for processing information. Computer system 700 also includes a memory 706, which can be a random access memory (RAM) or other dynamic storage device, coupled to bus 702 for creating business views, interaction views, and component views, and instructions to be executed by processor 704. Memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

A computer system 700 optimizes value chains. Consistent with one implementation of the invention, a graphical depiction of the collaboration of participants is provided by computer system 700 in response to processor 704 executing one or more sequences of one or more instructions contained in memory 706. Such instructions may be read into memory 706 from another computer-readable medium, such as storage device 710. Execution of the sequences of instructions contained in memory 706 causes processor 704 to perform the process states described herein. Alternatively hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as memory 706. Transmission media includes coaxial cables, copper wire, and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector coupled to bus 702 can receive the data carried in the infra-red signal and place the data on bus 702. Bus 702 carries the data to memory 706, from which processor 704 retrieves and executes the instructions. The instructions received by memory 706 may optionally be stored on storage device 710 either before or after execution by processor 704.

CONCLUSION

Systems and methods consistent with the present invention create a collaboration between members of an e-community within a CBS. The CBS combines one enterprise with various business partners from multiple industries to maximize the value potential for the participants involved in the collaboration. The CBS also provides tools to conceive and discuss new collaborative business models within various e-communities. The CBS may encompass electronic marketplaces and consumers.

The foregoing description of implementations consistent with the invention has been presented for purposes of illustration and description. It is not exhaustive and does not limit the invention to the precise form disclosed. Modifications and variations are potential in light of the above teachings or may be acquired from practicing of the invention. Persons skilled in the art will appreciate that other e-communities may be used, such as automotive, chemicals, or high technology. Moreover, the described implementation includes software but the present invention may be implemented as a combination of hardware and software or in hardware alone.

We claim:

1. An article for displaying a supply-chain collaboration between supply-chain participants, the supply-chain participants being members of a business community and the supply-chain participants interacting according to a pre-defined consecutive order, the article comprising a tangible machine-readable medium embodying instructions that when performed by one or more machines result in operations comprising:

receiving data that identifies the supply-chain participants and interactions between the supply-chain participants;

receiving data that identifies the consecutive order of the interactions;

processing the data received to display in a first view, at least two columns representing business activities of the supply-chain participants, each column representing at least one of the supply-chain participants in the interactions, order of the columns from left to right represents a flow of goods, and the business activities being represented by individual polygons within the at least two columns;

processing the data received to display in the first view, the business activities in individual polygons, the polygons being positioned adjacent to each other in order to represent the interactions between the supply-chain participants in the supply-chain collaboration; processing the data received to display in a second view, the at least two columns in the same order as the first view, the polygons being non-adjacent and being connected by lines, and the interactions between the supply-chain participants being represented by the lines connecting the polygons; and processing the data received to display in a third view, the at least two columns, the at least two columns including at least one additional column, each of the at least one additional columns representing specific computer components used to implement the interactions between the supply-chain participants and utilization of the computer components by the supply-chain participants.

2. An article as in claim 1, wherein the article further embodies instructions that when performed by one or more machines result in operations comprising:

displaying on the left of the at least two columns in the first view, an additional two columns, one of the additional two columns listing qualitative business benefits provided by the supply-chain collaboration of the supply-chain participants, and the second of the additional two columns representing quantitative business benefit information, wherein the qualitative and quantitative business benefit information represents upstream benefits from the supply-chain collaboration between the supply-chain participants.

3. An article as in claim 1, wherein the article further embodies instructions that when performed by one or more machines result in operations comprising:

displaying on the right of the at least two columns in the first view, an additional two columns, one of the two additional columns listing qualitative business benefits provided by the supply-chain collaboration of the supply-chain participants, and the second of the two additional columns representing quantitative business benefit information, wherein the qualitative and quantitative business benefit information represents downstream benefits from the supply-chain collaboration between the supply-chain participants.

4. An article as in claim 1, wherein the article further embodies instructions that when performed by one or more machines result in operations comprising:
generating the second view upon receiving a request from a user to alter the first view.

5. An article as in claim 1, wherein the polygons in the first view are hexagons.

6. An article as in claim 1, wherein displaying, in the third view, comprises displaying availability of the components.

7. An article as in claim 1, wherein the article further embodies instructions that when performed by one or more machines result in operations comprising:
detecting that a user shifts at least one of the polygons from a first area to a second area;
updating a variable that is related to the at least one of the polygons and that depends on which area the at least one of the polygons covers; and
updating and displaying a second variable that is a function of the first variable.

8. A system comprising: a storage medium for storing computer-readable code; and a processor for executing the computer-readable code, the computer-readable code, when executed, causing the processor to perform operations comprising:
receiving data that identifies the supply-chain participants and interactions between the supply-chain participants;
receiving data that identifies the consecutive order of the interactions;
processing the data received to display in a first view, at least two columns representing business activities of the supply-chain participants, each column representing at least one of the supply-chain participants in the interactions, order of the columns from left to right represents a flow of goods, and the business activities being represented by individual polygons within the at least two columns;
processing the data received to display in the first view, the business activities in individual polygons, the polygons being positioned adjacent to each other in order to represent the interactions between the supply-chain participants in the supply-chain collaboration; processing the data received to display in a second view, the at least two columns in the same order as the first view, the polygons being non-adjacent and being connected by lines, and the interactions between the supply-chain participants being represented by the lines connecting the polygons; and
processing the data received to display in a third view, the at least two columns, the at least two columns including at least one additional column, each of the at least one additional columns representing specific computer components used to implement the interactions between the supply-chain participants and utilization of the computer components by the supply-chain participants.

9. A system as in claim 8, wherein the computer-readable code, when executed, further causes the processor to perform operations comprising:
displaying on the left of the at least two columns in the first view, an additional two columns, one of the additional two columns listing qualitative business benefits provided by the supply-chain collaboration of the supply-chain participants, and the second of the additional two columns representing quantitative business benefit information, wherein the qualitative and quantitative business benefit information represents upstream benefits from the supply-chain collaboration between the supply-chain participants.

10. A system as in claim 8, wherein the computer-readable code, when executed, further causes the processor to perform operations comprising:
displaying on the right of the at least two columns in the first view, an additional two columns, one of the two additional columns listing qualitative business benefits provided by the supply-chain collaboration of the supply-chain participants, and the second of the two additional columns representing quantitative business benefit information, wherein the qualitative and quantitative business benefit information represents downstream benefits from the supply-chain collaboration between the supply-chain participants.

11. A system as in claim 8, wherein the computer-readable code, when executed, further causes the processor to perform operations comprising:
generating the second view upon receiving a request from a user to alter the first view.

12. A system as in claim 8, wherein the polygons in the first view are hexagons.

13. A system as in claim 8, wherein displaying, in the third view, comprises displaying availability of the components.

14. A system as in claim 8, wherein the computer-readable code, when executed, further causes the processor to perform operations comprising:
detecting that a user shifts at least one of the polygons from a first area to a second area;
updating a variable that is related to the at least one of the polygons and that depends on which area the at least one of the polygons covers; and
updating and displaying a second variable that is a function of the first variable.

15. An apparatus for displaying a supply-chain collaboration between supply-chain participants, the supply-chain participants being members of a business community and the supply-chain participants interacting according to a predefined consecutive order, the apparatus comprising:
means for receiving data that identifies the supply-chain participants and interactions between the supply-chain participants;
means for receiving data that identifies the consecutive order of the interactions;
means for processing the data received to display in a first view, at least two columns representing business activities of the supply-chain participants, each column representing at least one of the supply-chain participants in the interactions, order of the columns from left to right represents a flow of goods, and the business activities being represented by individual polygons within the at least two columns;
means for processing the data received to display in the first view, the business activities in individual polygons, the polygons being positioned adjacent to each other in order to represent the interactions between the supply-chain participants in the supply-chain collaboration;
means for processing the data received to display in a second view, the at least two columns in the same order as the first view, the polygons being non-adjacent and being connected by lines, and the interactions between the supply-chain participants being represented by the lines connecting the polygons; and means for processing the data received to display in a third view, the at least two columns, the at least two columns including at least one additional column, each of the at least one additional columns representing specific computer components used to implement the interactions between the supply-chain participants and utilization of the computer components by the supply-chain participants.

16. An apparatus as in claim 15 further comprising:

means for displaying on the left of the at least two columns in the first view, an additional two columns, one of the additional two columns listing qualitative business benefits provided by the supply-chain collaboration of the supply-chain participants, and the second of the additional two columns representing quantitative business benefit information, wherein the qualitative and quantitative business benefit information represents upstream benefits from the supply-chain collaboration between the supply-chain participants.

17. An apparatus as in claim 15 further comprising:

means for displaying on the right of the at least two columns in the first view, an additional two columns, one of the two additional columns listing qualitative business benefits provided by the supply-chain collaboration of the supply-chain participants, and the second of the two additional columns representing quantitative business benefit information, wherein the qualitative and quantitative business benefit information represents downstream benefits from the supply-chain collaboration between the supply-chain participants.

18. An apparatus as in claim 15 further comprising:

means for generating the second view upon receiving a request from a user to alter the first view.

19. An apparatus as in claim 15, wherein the polygons in the first view are hexagons.

20. An apparatus as in claim 15, wherein displaying, in the third view, comprises displaying availability of the components.

21. An apparatus as in claim 15 further comprising:

means for detecting that a user shifts at least one of the polygons from a first area to a second area;

means for updating a variable that is related to the at least one of the polygons and that depends on which area the at least one of the polygons covers; and means for updating and displaying a second variable that is a function of the first variable.

* * * * *